(12) United States Patent
Takamizawa

(10) Patent No.: US 9,329,071 B2
(45) Date of Patent: May 3, 2016

(54) SUBSTRATE PROCESSING APPARATUS

(71) Applicant: ASM IP Holding B.V., Almere (NL)

(72) Inventor: Hisashi Takamizawa, Tokyo (JP)

(73) Assignee: ASM IP Holding B.V., Almere (NL)

( * ) Notice: Subject to any disclaimer, the term of this patent is extended or adjusted under 35 U.S.C. 154(b) by 254 days.

(21) Appl. No.: 14/257,484

(22) Filed: Apr. 21, 2014

(65) Prior Publication Data

US 2015/0300865 A1    Oct. 22, 2015

(51) Int. Cl.
*G08B 21/00* (2006.01)
*G01F 23/00* (2006.01)

(52) U.S. Cl.
CPC .................. *G01F 23/0061* (2013.01)

(58) Field of Classification Search
CPC .............................. G01F 23/0061; G01F 23/00
USPC .......................................................... 340/618
See application file for complete search history.

(56) References Cited

U.S. PATENT DOCUMENTS

| | | | | | |
|---|---|---|---|---|---|
| 4,084,547 | A | * | 4/1978 | Deziel | G01F 23/36 340/618 |
| 5,035,200 | A | * | 7/1991 | Moriyama | B01J 19/0006 118/693 |
| 5,519,638 | A | * | 5/1996 | Tiao | G05D 9/12 340/618 |
| 6,780,277 | B2 | * | 8/2004 | Yokomizo | H01L 21/67086 156/345.11 |
| 6,878,303 | B2 | * | 4/2005 | Okamoto | H01L 21/67253 118/52 |
| 8,286,482 | B2 | * | 10/2012 | Yamamoto | B01J 4/008 116/227 |
| 8,607,730 | B2 | * | 12/2013 | Eshima | H01L 21/67051 137/389 |
| 9,192,878 | B2 | * | 11/2015 | Mizota | B01D 19/0005 |
| 2007/0125171 | A1 | * | 6/2007 | Tanaka | G01F 23/02 73/290 R |
| 2007/0134822 | A1 | * | 6/2007 | Yamamoto | B01F 3/08 438/14 |
| 2011/0132465 | A1 | | 6/2011 | Eshima | |

* cited by examiner

*Primary Examiner* — Eric M Blount
(74) *Attorney, Agent, or Firm* — Studebaker & Brackett PC

(57) ABSTRACT

The amount of processing liquid consumed from the processing liquid in the tank is calculated based on the history of opening and closing events of one or more of the valves, and that the anomaly detection controller of the substrate processing apparatus generates a level sensor failure alarm if the calculated amount of consumed processing liquid has increased beyond a state transition liquid consumption amount and yet the level sensor has not switched from the first state to the second state. The substrate processing apparatus and the level sensor are designed so that the level sensor switches from the first state to the second state when the calculated amount of consumed processing liquid has increased beyond the state transition liquid consumption amount.

10 Claims, 4 Drawing Sheets

FIG. 2

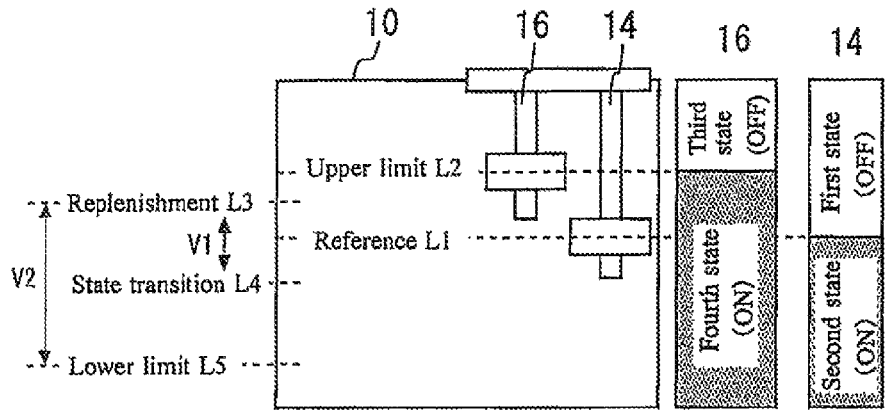

FIG. 3

| Name | Purpose or detailes |
|---|---|
| DI number | Retrieving information about state of a particlular level sensor |
| DO number | Retrieving information as to whether a particular valve is opened or closed |
| Processing liquid consumption rate | Amount of processing liquid consumed from the processing liquid in the tank per unit time [ml/sec] |
| State transition liquid consumption amount [ST amount] | Amount of processing liquid required to be consumed to lower the level of the processing liquid from L3 to L4 [ml]. |
| Maximum allowable liquid consumption level [MA amount] | Amount of processing liquid required to be consumed to lower the level of the processing liquid from L3 to L5 [ml]. |
| Calculated amount of consumed processing liquid | Consumed processing liquid calculated in UPC |

SUBSTRATE PROCESSING APPARATUS

BACKGROUND OF THE INVENTION

1. Field of the Invention

The present invention relates to a substrate processing apparatus for processing a substrate using a processing liquid.

2. Background Art

US 2011/0132465A1 discloses a substrate processing apparatus which processes a substrate using a processing liquid stored in a tank.

In some cases, a tank for storing a processing liquid is provided with a level sensor for detecting the level of the processing liquid at a predetermined level. The level sensor outputs a signal indicating, e.g., whether the level of the processing liquid in the tank is below or above the predetermined level, and this signal is used to determine whether or not to replenish the processing liquid in the tank. If this level sensor fails, however, the processing liquid cannot be timely replenished. Therefore, it is necessary to detect the failure of the level sensor.

In order to detect and address the failure of the level sensor, the tank may be additionally provided with a low level sensor for detecting the level of the processing liquid in the tank at a level which is lower than the above predetermined level. However, such a low level sensor is liable to corrode quickly, since it is continuously immersed in the processing liquid for long periods of time. This means that a short replacement cycle is required for the low level sensor, thus resulting in increased operating cost.

SUMMARY OF THE INVENTION

The present invention has been made to solve the above problems. It is, therefore, an object of the present invention to provide a low-cost substrate processing apparatus capable of detecting failure of its level sensor.

The features and advantages of the present invention may be summarized as follows.

According to one aspect of the present invention, a substrate processing apparatus includes a tank storing a processing liquid, a level sensor which assumes a first state when a level of the processing liquid is higher than a predetermined reference level and which assumes a second state when a level of the processing liquid is lower than the predetermined reference level, a substrate processing chamber for processing a substrate, a material gas supply line connected between the tank and the substrate processing chamber and used for introducing a material gas containing components of the processing liquid into the substrate processing chamber, a valve for opening and closing the material gas supply line, a processing controller for detecting whether the level sensor is in the first state or the second state and controlling opening and closing of the valve, and an anomaly detection controller for calculating the amount of processing liquid consumed from the processing liquid in the tank based on a history of opening and closing events of the valve, and for generating a failure alarm if the calculated amount of consumed processing liquid has increased beyond a predetermined state transition liquid consumption amount and yet the level sensor has not switched from the first state to the second state, wherein the substrate processing apparatus and the level sensor are designed so that the level sensor switches from the first state to the second state when the calculated amount of consumed processing liquid has increased beyond the state transition liquid consumption amount.

Other and further objects, features and advantages of the invention will appear more fully from the following description.

BRIEF DESCRIPTION OF THE DRAWINGS

FIG. 2 shows the two different states of the level sensor and the two different states of the high level sensor;

FIG. 3 is a table listing the data stored in the data storage unit;

DETAILED DESCRIPTION OF THE PREFERRED EMBODIMENT

Figure 1:
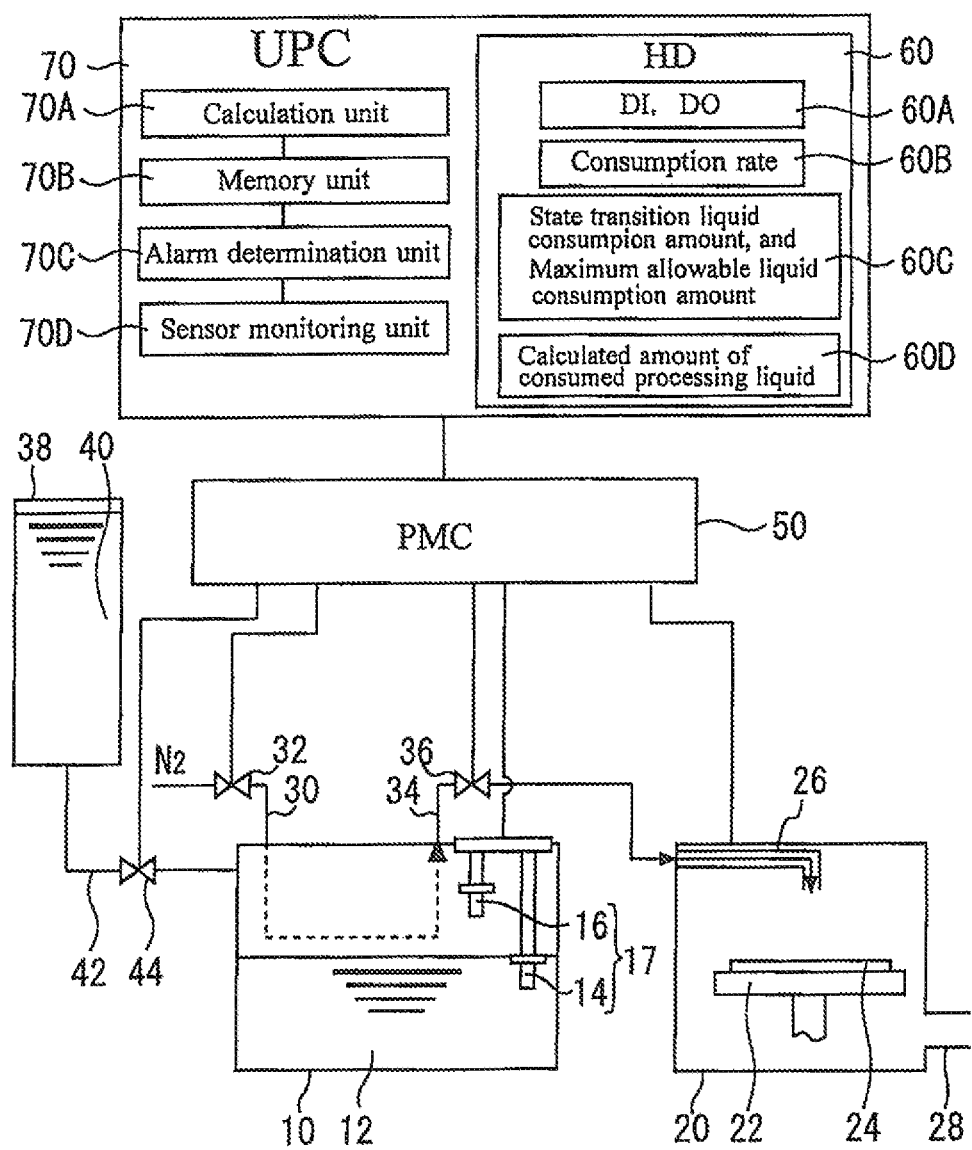
FIG. 1 is a diagram showing a substrate processing apparatus in accordance with an embodiment of the present invention.

A substrate processing apparatus in accordance with an embodiment of the present invention will be described with reference to the accompanying drawings. Throughout the specification the same or corresponding components are designated by the same reference numerals and may be described only once.

Embodiment

FIG. 1 is a diagram showing a substrate processing apparatus in accordance with an embodiment of the present invention. This substrate processing apparatus has a tank 10 (main tank) which stores a processing liquid 12. The tank 10 is provided with a level sensor 14 and a high level sensor 16 for detecting the level of the processing liquid 12 at different levels. The level sensor 14 and the high level sensor 16 may be of any type capable of detecting the level of the processing liquid 12. Examples of such sensors include proximity sensors. The level sensor 14 and the high level sensor 16 may be hereinafter referred to collectively as the sensor 17.

The substrate processing apparatus has a substrate processing chamber 20 for processing a substrate. A stage 22 is disposed in the substrate processing chamber 20, and a substrate 24 is mounted on the stage 22. The substrate processing chamber 20 is provided with a supply line 26 for delivering material gas to the substrate 24. The substrate processing chamber 20 is also provided with an exhaust line 28 through which used material gas is discharged from the chamber.

An inert gas supply line 30 for supplying inert gas to the tank 10 is connected to the tank 10. $N_2$ gas or Ar gas, etc. is passed through the inert gas supply line 30. The inert gas supply line 30 is opened and closed by means of an inert gas valve 32.

The tank 10 is connected to the substrate processing chamber 20 by a material gas supply line 34. The material gas supply line 34 is used to introduce a material gas containing components of the processing liquid 12 into the substrate processing chamber 20. The material gas supply line 34 is opened and closed by means of a valve 36.

The substrate processing apparatus also has a replenishment tank 38 for replenishing the processing liquid 12 in the tank 10. The replenishment tank 38 stores a processing liquid 40. The replenishment tank 38 is connected to the tank 10 by a replenishment line 42. The replenishment line 42 is opened and closed by means of a replenishment valve 44.

FIG. 2 is a diagram showing, among others, the two different states of the level sensor 14 and the two different states of the high level sensor 16. Specifically, the rightmost column 14 of FIG. 2 illustrates the relationship between the level of the processing liquid 12 and the state of the level sensor 14. In the course of the processing liquid consumption, when the level of the processing liquid 12 is higher than a predetermined reference level L1, the level sensor 14 is in a first state (or its OFF state), and when the level of the processing liquid 12 is lower than the reference level L1, the level sensor 14 is in a second state (or its ON state).

In FIG. 2, the column 16 shown between the tank 10 and the column 14 illustrates the relationship between the level of the processing liquid 12 and the state of the high level sensor 16. As shown, when the level of the processing liquid 12 is higher than an upper limit level L2, the high level sensor 16 is in a third state (or its OFF state), and when the level of the processing liquid 12 is lower than the upper limit level L2, the high level sensor 16 is in a fourth state (or its ON state). As can be seen from FIG. 2, the upper limit level L2 is higher than the reference level L1.

Referring back to FIG. 1, the substrate processing apparatus includes a processing controller 50 configured of, e.g., a process module controller (PMC), in order to control components for processing a substrate. The processing controller 50 is connected to the sensor 17 so as to detect the state of the sensor 17. Specifically, the processing controller 50 detects whether the level sensor 14 is in the first or second state and whether the high level sensor 16 is in the third state or fourth state.

Further, the processing controller 50 is connected to the inert gas valve 32, the valve 36, and the replenishment valve 44 in order to control the opening and closing of these valves. The processing controller 50 is also connected to the substrate processing chamber 20 in order to control the temperature of the stage 22, etc.

The data storage unit 60 is, e.g., a hard disk and stores data required to operate the substrate processing apparatus. Specifically, the data storage unit 60 stores DI numbers and DO numbers (collectively labeled with reference numeral 60A in FIG. 1). Each DI number is used to retrieve information about the state of a particular level sensor. Specifically, for example, a DI number DI1 is assigned to the level sensor 14, and a DI number DI2 is assigned to the high level sensor 16.

Each DO number is used to retrieve information as to whether a particular valve is opened or closed. Specifically, for example, a DO number DO1 is assigned to the inert gas valve 32, a DO number DO2 is assigned to the valve 36, and a DO number DO3 is assigned to the replenishment valve 44.

The data storage unit 60 also stores the processing liquid consumption rate 60B of the substrate processing apparatus, which refers to the amount of processing liquid consumed from the processing liquid 12 in the tank 10 per unit time when the inert gas valve 32 and the valve 36 are open.

The data storage unit 60 also stores the state transition liquid consumption amount of the substrate processing apparatus, which refers to the amount of processing liquid required to be consumed to lower the level of the processing liquid 12 in the tank 10 from a replenishment completion level L3 to a state transition level L4. As shown in the FIG. 2, the replenishment completion level L3 refers to the level of the processing liquid 12 in the tank 10 after it has been replenished and the state transition level L4 refers to the level of the processing liquid 12 at which the level sensor 14 transitions from the first state (its OFF state) to the second state (its ON state) after a certain amount of processing liquid has been consumed from the tank 10. The state transition level L4 must be a substantial distance below the reference level L1.

The data storage unit 60 also stores the maximum allowable liquid consumption amount of the substrate processing apparatus, which refers to the amount of processing liquid required to be consumed to lower the level of the processing liquid 12 in the tank 10 from the replenishment completion level L3 to a lower limit level L5. The lower limit level L5 should preferably be a level at which a slight amount of processing liquid remains on the bottom of the tank 10. In FIG. 1, the state transition liquid consumption amount and the maximum allowable liquid consumption amount described above are collectively labeled with reference numeral 60C. In FIG. 2, the state transition liquid consumption amount is labeled with reference numeral V1, and the maximum allowable liquid consumption amount is labeled with reference numeral V2. The maximum allowable liquid consumption amount V2 is greater than the state transition liquid consumption amount V1.

The data storage unit 60 also stores calculated amount of consumed processing liquid which is labeled with reference numeral 60D. It should be noted that FIG. 3 is a table listing the data stored in the data storage unit 60.

Referring back to FIG. 1, the processing controller 50 has connected thereto an anomaly detection controller 70 configured of, e.g., a unique platform control (UPC). The anomaly detection controller 70 includes the data storage unit 60. The anomaly detection controller 70 is primarily used to detect failure of the level sensor 14. The anomaly detection controller 70 includes a calculation unit 70A, a memory unit 70B, an alarm determination unit 70C, and a sensor monitoring unit 70D.

The primary functions of the components of the anomaly detection controller 70 will now be described. The calculation unit 70A calculates the amount of processing liquid consumed from the processing liquid 12 in the tank 10. The memory unit 70B stores this calculated amount of consumed processing liquid. The alarm determination unit 70C generates a failure alarm upon the occurrence of failure of the level sensor 14. The sensor monitoring unit 70D detects a transition in the state of the level sensor 14, etc., and clears or zeros out the calculated amount of consumed processing liquid written both to, the memory unit 70B and the calculated amount of consumed processing liquid 60D after the processing liquid 12 in the tank 10 has been replenished.

The following description will be directed to the operation of the substrate processing apparatus of the present embodiment. In this substrate processing apparatus, the anomaly detection operation is conducted simultaneously with the fundamental operation (for processing a substrate, etc.). First, the fundamental operation will be described. The processing controller 50 processes the substrate 24 according to a recipe stored in the controller.

Specifically, the processing controller 50 opens the inert gas valve 32 and the valve 36 simultaneously to supply an appropriate amount of material gas to the substrate processing chamber 20 so that a film is formed on the substrate 24. Further, the processing controller 50 adjusts film forming conditions such as the temperature of the stage 22.

Further, when the processing controller 50 has detected that the level of the processing liquid 12 has dropped below the reference level L1 and, as a result, the level sensor 14 has switched to the second state (or its ON state), the processing controller 50 opens the replenishment valve 44 to replenish the processing liquid 12 in the tank 10 through the replenishment line 42. This processing liquid replenishment operation through the replenishment line 42 is continued until the level sensor 14 has switched from the second state to the first state. That is, the replenishment operation is ended by closing the replenishment valve 44 after the level of the processing liquid 12 in the tank 10 has reached the replenishment completion level L3 shown in FIG. 2. Setting the replenishment completion level L3 greater than reference level L1 prevents meaningless state transition of level sensor 14 that may happen when the replenishment completion level L3 is equal to reference level L1.

However, if the program of the processing controller 50 has a bug, the processing liquid replenishment operation may continue even after the level of the processing liquid 12 in the tank 10 has reached the replenishment completion level L3. To safeguard against such an event, the processing controller 50 is designed to detect whether the high level sensor 16 is in the third state (or its OFF state) or the fourth state (its ON state) during the processing liquid replenishment operation, and close the replenishment valve 44 if the high level sensor 16 is in the third state. This prevents the level of the processing liquid 12 in the tank 10 from significantly exceeding the upper limit level L2 shown in FIG. 2. Thus the fundamental operation of the substrate processing apparatus includes processing a substrate and replenishing the processing liquid in the tank.

Figure 4:
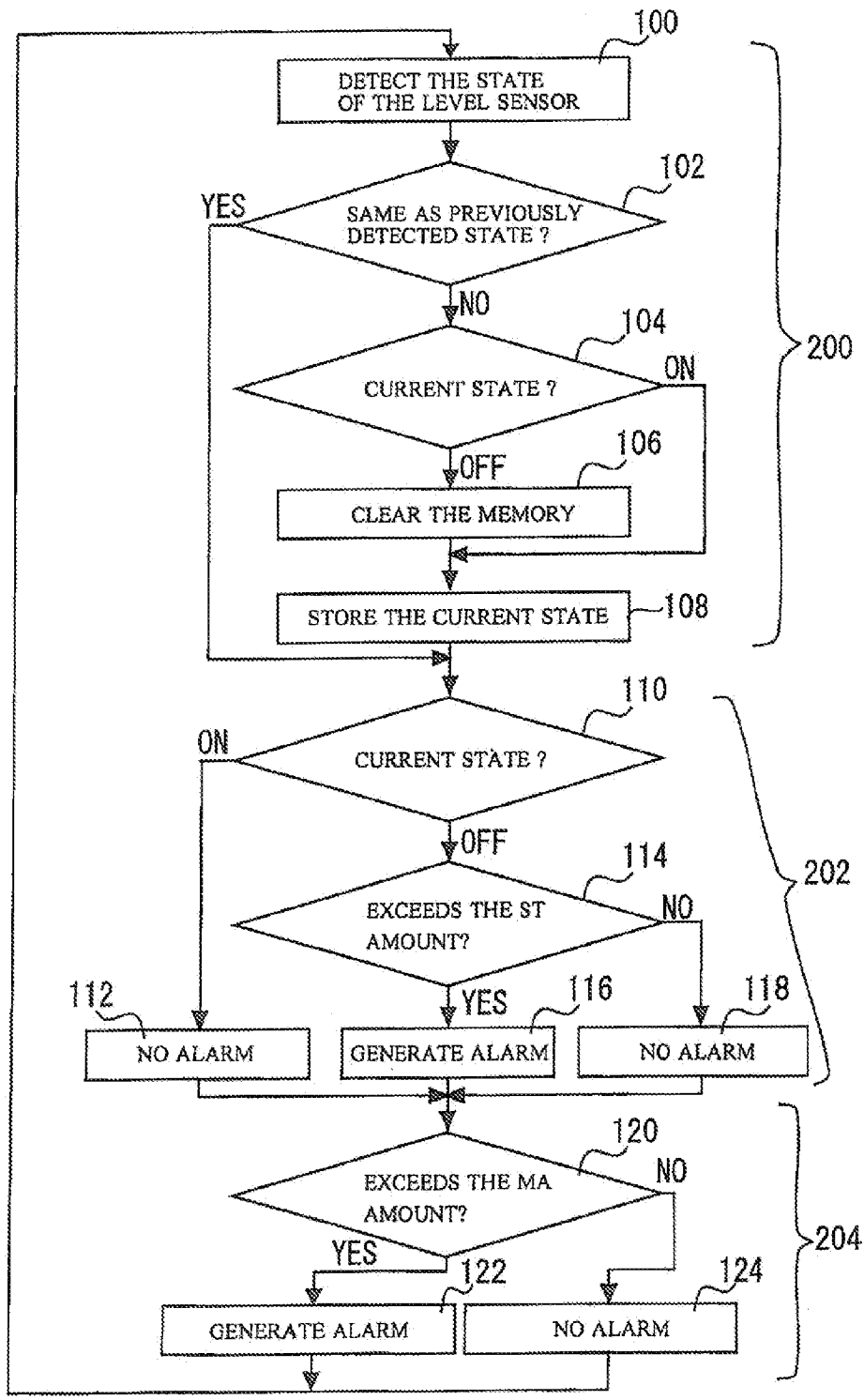
FIG. 4 is a flowchart showing the anomaly detection operation.
Figure 5:
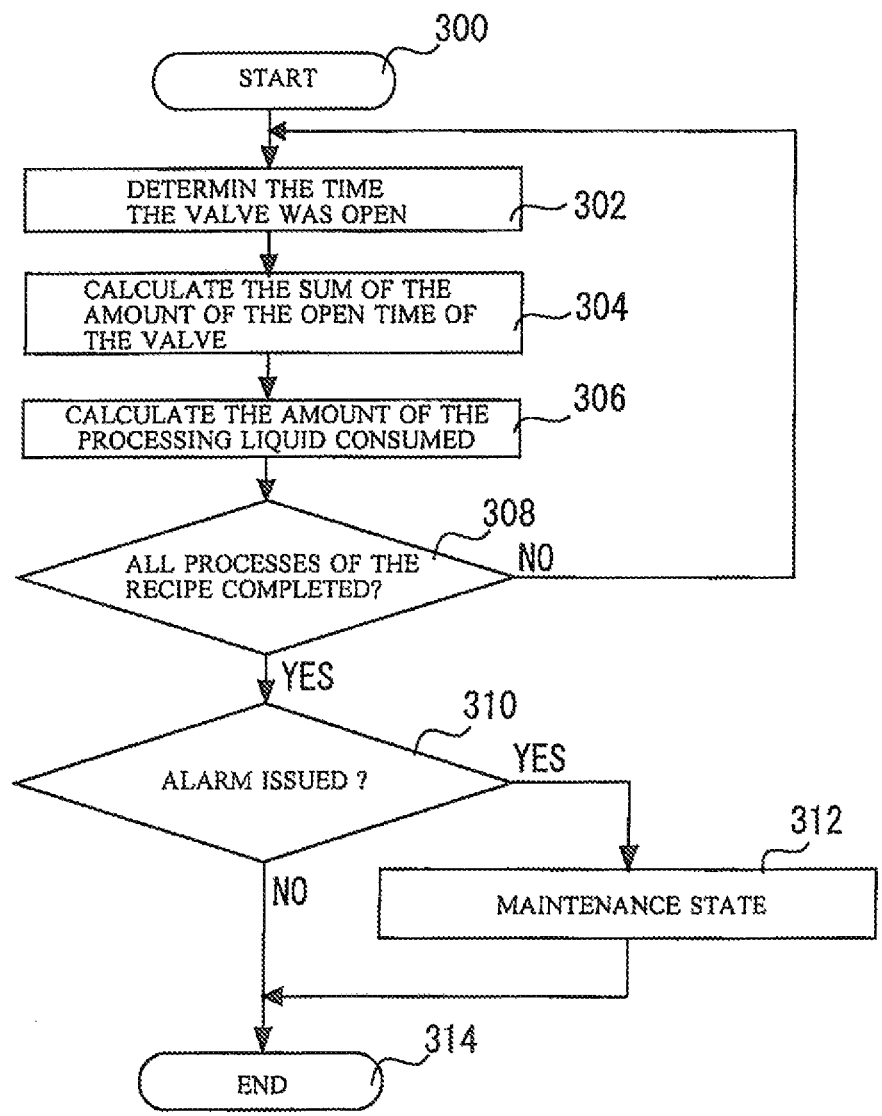
FIG. 5 is a flow chart showing how the anomaly detection controller calculates the amount of processing liquid consumed in the substrate processing apparatus and generates alarms.

The following description will be directed to the anomaly detection operation of the substrate processing apparatus which proceeds in parallel with the above fundamental operation. The anomaly detection operation is conducted by the anomaly detection controller 70. FIGS. 4 and 5 are flowcharts illustrating the anomaly detection operation. The anomaly detection operation will be described first with reference to FIG. 4. First, in Step 100, the sensor monitoring unit 70D detects the state of the level sensor 14. Specifically, the sensor monitoring unit 70D reads the DI number DI1 of the level sensor 14 from the data storage unit 60 and retrieves information about the state of the level sensor 14 from the processing controller 50 using the read DI number DI1.

The operation flow then proceeds to Step 102. In Step 102, the anomaly detection controller 70 determines whether the state of the level sensor 14 detected in Step 100 is the same as the previously detected state of the level sensor 14.

If the determination is no, the operation flow proceeds to Step 104. In Step 104, the anomaly detection controller 70 determines whether the level sensor 14 is currently in the first state (i.e., its OFF state) or second state (i.e., its ON state). If the level sensor 14 is in the first state, in Step 106 the controller clears or zeros out the calculated amount of consumed processing liquid stored in the memory unit 70B and calculated amount of consumed processing liquid 60D, assuming that the level sensor 14 has switched from the second state to the first state as a result of replenishment of the processing liquid 12 in the tank 10. That is, upon detecting the completion of replenishment of the processing liquid 12 in the tank 10, the anomaly detection controller 70 clears or zeros out the calculated amount of consumed processing liquid stored in the memory unit 70B and calculated amount of consumed processing liquid 60D.

If, on the other hand, in Step 104 the level sensor 14 is determined to be in the second state, the anomaly detection controller 70 does not clear or zeros out the calculated amount of consumed processing liquid stored in the memory unit 70B and calculated amount of consumed processing liquid 60D. In Step 108, the anomaly detection controller 70 stores the current state of the level sensor 14 in, e.g., the memory unit 70B whether the current state is determined to be the first state or second state in Step 104. In this way the anomaly detection controller 70 stores the most recent state of the level sensor 14.

The operation flow then proceeds to Step 110. In Step 110, the alarm determination unit 70C of the anomaly detection controller 70 reads data from the memory unit 70B and determines the current state of the level sensor 14. If the level sensor 14 is determined to be in the second state, the anomaly detection controller 70 does not generate a failure alarm, assuming that the level sensor 14 has not failed (Step 112).

If, on the other hand, the level sensor 14 is determined to be in the first state, the operation flow proceeds to Step 114. In Step 114, the alarm determination unit 70C reads the calculated amount of consumed processing liquid stored in the memory unit 70B and the state transition liquid consumption amount stored in the data storage unit 60. If the calculated amount of consumed processing liquid exceeds the state transition liquid consumption amount, in Step 116 the anomaly detection controller 70 generates a failure alarm, assuming that the level sensor 14 has failed, since the level sensor 14 is in the first state although it should have switched to the second state. Examples of methods of giving such a failure alarm include, but are not limited to, displaying an alarm on a display and emitting a sound. If, on the other hand, the calculated amount of consumed processing liquid does not exceed the state transition liquid consumption amount, the anomaly detection controller 70 does not generate a failure alarm (Step 118).

The operation flow then proceeds to Step 120. In Step 120, the alarm determination unit 70C of the anomaly detection controller 70 reads the calculated amount of consumed processing liquid stored in the memory unit 70B and the maximum allowable liquid consumption amount stored in the data storage unit 60. The alarm determination unit 70C then determines whether the calculated amount of consumed processing liquid exceeds the maximum allowable liquid consumption amount. If the calculated amount of consumed processing liquid exceeds the maximum allowable liquid consumption amount, the alarm determination unit 70C generates a low liquid alarm (Step 122). If, on the other hand, the calculated amount of consumed processing liquid does not exceed the maximum allowable liquid consumption amount, the alarm determination unit 70C does not generate a low liquid alarm (Step 124).

The operation shown in FIG. 4 is broadly divided into three sub-operations: the first operation 200 (including Steps 100 to 108), the second operation 202 (including Steps 110 to 118), and the third operation 204 (including Steps 120 to 124). The first operation 200 is to detect a transition in the state of the level sensor 14 and clear or zero out the calculated amount of consumed processing liquid stored in the memory unit 70B and calculated amount of consumed processing liquid 60D if the processing liquid 12 in the tank 10 is determined to have been replenished. The second operation 202 is to detect when the level sensor 14 has failed and generate a failure alarm. The third operation 204 is to detect when the calculated amount of consumed processing liquid has exceeded the maximum allowable liquid consumption amount (i.e., when the level of the processing liquid 12 in the tank 10 has dropped below the lower limit level) and generate a low liquid alarm.

After the completion of the first to third operations, the operation flow returns to the first operation, and the first to third operations are performed again. In this way, the anomaly detection controller 70 detects an increase or a decrease in the level of the processing liquid 12 in the tank 10 during the processing of the substrate 24 and thereby detects when the level sensor 14 has failed and when the level of the processing liquid 12 in the tank 10 has dropped below the lower limit level.

With reference to FIG. 5, the following description will be directed to how the anomaly detection controller 70 calculates the amount of processing liquid consumed in the substrate processing apparatus and generates alarms. First, in Step 300, the calculation unit 70A begins to operate when the processing controller 50 begins to process the substrate 24 according to a recipe. It should be noted that the recipe specifies process conditions for a series of processes to be performed. The following description assumes that the recipe specifies process conditions for a first process and a second process.

The operation flow then proceeds to Step 302, thereby entering the first iteration of Steps 302 to 308. In Step 302, the calculation unit 70A determines the amount of time the valve 36 was open during one of the processes of the recipe (in this iteration, the first process). Specifically, the calculation unit 70A reads the DO number DO2 of the valve 36 from the data storage unit 60, then retrieves the history of opening and closing events of the valve 36 during the first process from the processing controller 50 using the read DO number DO2, and determines the amount of time the valve 36 was open during the first process.

The operation flow then proceeds to Step 304. In Step 304, the calculation unit 70A calculates the sum of the amounts of open time of the valve 36 calculated in this and previous iterations. It should be noted that in this iteration (the first iteration), the calculated sum is simply equal to the amount of open time of the valve 36 during the first process determined in Step 302 above.

The operation flow then proceeds to Step 306. In Step 306, the calculation unit 70A calculates the amount of processing liquid consumed in the substrate processing apparatus. Specifically, the sum of the amounts of open time of the valve 36 calculated in Step 304 is multiplied by the processing liquid consumption rate 60B read from the data storage unit 60 to calculate the amount of consumed processing liquid. The calculated amount of consumed processing liquid is written both to, the memory unit 70B of the anomaly detection controller 70 and calculated amount of consumed processing liquid 60D, thereby completing Step 306.

The operation flow then proceeds to Step 308. In Step 308, the anomaly detection controller 70 determines whether all processes of the recipe have been subjected to Steps 302 to 306. It should be noted that since the second process of the recipe has not yet been subjected to Steps 302 to 306, the determination is no. Therefore, the operation flow returns to Step 302 and enters the second iteration of Steps 302 to 308.

In Step 302 of this subsequent iteration, the calculation unit 70A determines the amount of time the valve 36 was open during the second process in the same manner as that described in connection with the first process in the previous iteration. The operation flow then proceeds to Step 304. In Step 304 of this iteration, the amount of open time of the valve 36 during the second process is added to the amount of open time of the valve 36 during the first process calculated in the previous iteration to produce a cumulative amount of open time of the valve 36.

The operation flow then proceeds to Step 306. In Step 306 of this iteration, the cumulative amount of open time of the valve 36 obtained in Step 304 is multiplied by the processing liquid consumption rate 60B read from the data storage unit 60 to calculate the amount of processing liquid cumulatively consumed during the first and second processes. This calculated amount of consumed processing liquid is written both to, the memory unit 70B and calculated amount of consumed processing liquid 60D.

The operation flow then proceeds to Step 308. In Step 308, the anomaly detection controller 70 determines whether all processes of the recipe have been subjected to Steps 302 to 306. In this iteration, the determination in Step 308 is yes and therefore the operation flow proceeds to Step 310. In Step 310, the calculation unit 70A of the anomaly detection controller 70 determines whether a failure alarm and/or a low liquid alarm have been issued. If a failure alarm and/or a low liquid alarm have been issued, in Step 312 the anomaly detection controller 70 sends to the processing controller 50 a signal for causing the processing controller 50 to assume a maintenance state. If, on the other hand, a failure alarm and a low liquid alarm have not been issued, the anomaly detection controller 70 ends this operation in Step 314.

Thus, the substrate processing apparatus is caused to assume a maintenance required state, if necessary, only after all processes of the recipe have been completed, thereby preventing interruption of the processing of the substrate.

Referring to FIGS. 4 and 5, in Step 106 shown in FIG. 4 the anomaly detection controller 70 clears or zeros out the calculated amount of consumed processing liquid stored in the memory unit 70B and calculated amount of consumed processing liquid 60D. This is accomplished by clearing or zeroing out the cumulative amount of open time of the valve 36 calculated in Step 304 of FIG. 5. Specifically, if, in Step 104 of FIG. 4, the processing liquid 12 in the tank 10 is found to have been replenished during processing according to a recipe, the cumulative amount of open time of the valve 36 calculated in Step 304 of FIG. 5 is set to zero, making it possible to calculate the amount of processing liquid consumed after the replenishment of the processing liquid 12 in the tank 10.

An important feature of the substrate processing apparatus of the present embodiment is that the amount of processing liquid consumed from the processing liquid 12 in the tank 10 is calculated based on the history of opening and closing events of one or more of the valves, and that the anomaly detection controller 70 of the substrate processing apparatus generates a level sensor failure alarm if the calculated amount of consumed processing liquid has increased beyond a state transition liquid consumption amount and yet the level sensor 14 has not switched from the first state (i.e., its OFF state) to the second state (i.e., its ON state). (It should be noted that the substrate processing apparatus and the level sensor 14 are designed so that the level sensor 14 switches from the first state to the second state when the calculated amount of consumed processing liquid has increased beyond the state transition liquid consumption amount.) Various alterations may be made to the substrate processing apparatus of the present embodiment while retaining the above feature. Several alterations are described below.

The processing controller 50 opens and closes the inert gas valve 32 and the valve 36 simultaneously, meaning that the amount of open time of the inert gas valve 32 is equal to that of the valve 36. Therefore, the amount of processing liquid consumed from the processing liquid 12 in the tank 10 may be calculated using the amount of open time of either one of the two valves. However, it is preferable to detect the histories of opening and closing events of both the inert gas valve 32 and the valve 36, since the inert gas valve 32 and the valve 36 may not be simultaneously opened or closed for some reason.

Specifically, the amount of time both the inert gas valve 32 and the valve 36 are open may be referred to herein as the amount of open time of the combination of the inert gas valve 32 and the valve 36. The calculation unit 70A of the anomaly detection controller 70 reads the DO number DO1 of the inert gas valve 32 and the DO number DO2 of the valve 36 from the data storage unit 60 and retrieves the histories of opening and closing events of these valves from the processing controller 50 using the read DO numbers DO1 and D02. The calculation unit 70A then determines the amount of open time of the combination of these valves based on the retrieved histories of opening and closing events and multiplies the determined amount of open time of the combination by the processing liquid consumption rate of the substrate processing apparatus to calculate the amount of consumed processing liquid. The calculated amount of consumed processing liquid thus determined is considered to be more accurate than that determined based on the history of opening and closing events of the valve 36 alone.

The high level sensor 16 may be omitted from the substrate processing apparatus of the present embodiment. It is common practice to stop the replenishment of the processing liquid 12 in the tank 10 at a replenishment completion level L3 that is greater than the reference level L1. The high level sensor 16 is provided in case the replenishment should not stop. Therefore, if it is certain that the program has no bug and hence the replenishment will properly stop, then the high level sensor 16 may be omitted.

A plurality of tanks storing different processing liquids may be connected to the substrate processing chamber 20, and material gas may be supplied from these tanks to the chamber. In such cases, a different DO number may be assigned to each of the inert gas valve, the main valve, and the replenishment valve provided to each tank. Further, a different DI number may be assigned to each sensor provided to each tank. This enables the anomaly detection controller 70 to retrieve the histories of opening and closing events of the valves from the processing controller 50 using their DO numbers. Further, the anomaly detection controller 70 can also retrieve information as to the states of the sensors from the processing controller 50 using their DI numbers. Therefore, the anomaly detection controller 70 may perform the anomaly detection operation of FIG. 4 for each tank (or each processing liquid) sequentially.

The substrate processing apparatus may have a plurality of substrate processing chambers, and material gas may be supplied from a single common tank to these substrate processing chambers. The following description assumes that the substrate processing apparatus has a first substrate processing chamber and a second substrate processing chamber. If material gas is supplied to the first and second substrate processing chambers simultaneously, then the amount of open time of the valve connected to either the first or second substrate processing chamber may be determined based on the history of opening and closing events of the valve, and the amount of processing liquid consumed from the processing liquid in the tank may be calculated using the determined amount of open time of the valve.

However, if material gas is not simultaneously supplied to the first substrate processing chamber and the second substrate processing chamber, then both the amount of open time of the valve connected to the first substrate processing chamber and the amount of open time of the valve connected to the second substrate processing chamber may be determined based on the histories of opening and closing events of these valves, and the amount of processing liquid consumed from the processing liquid in the tank may be calculated using the sum of these amounts of open time.

Thus the present invention enables a substrate processing apparatus to detect failure of its level sensor by means of software, thereby reducing the cost of the substrate processing apparatus.

Obviously many modifications and variations of the present invention are possible in the light of the above teachings. It is therefore to be understood that within the scope of the appended claims the invention may be practiced otherwise than as specifically described.

What is claimed is:

1. A substrate processing apparatus comprising:
   a tank storing a processing liquid;
   a level sensor which assumes a first state when a level of said processing liquid is higher than a predetermined reference level and which assumes a second state when a level of said processing liquid is lower than said predetermined reference level;
   a substrate processing chamber for processing a substrate;
   a material gas supply line connected between said tank and said substrate processing chamber and used for introducing a material gas containing components of said processing liquid into said substrate processing chamber;
   a valve for opening and closing said material gas supply line;
   a processing controller for detecting whether said level sensor is in said first state or said second state and controlling opening and closing of said valve; and
   an anomaly detection controller for calculating a amount of processing liquid consumed from said processing liquid in said tank based on a history of opening and closing events of said valve, and for generating a failure alarm if said calculated amount of consumed processing liquid has increased beyond a predetermined state transition liquid consumption amount and yet said level sensor has not switched from said first state to said second state, wherein said substrate processing apparatus and said level sensor are designed so that said level sensor switches from said first state to said second state when said calculated amount of consumed processing liquid has increased beyond said state transition liquid consumption amount.

2. The substrate processing apparatus according to claim 1, wherein said anomaly detection controller has a calculation unit for calculating said calculated amount of consumed processing liquid, a memory unit for storing said calculated amount of consumed processing liquid, and an alarm determination unit for generating said failure alarm if said calculated amount of consumed processing liquid stored in said memory unit has increased beyond said state transition liquid consumption amount and yet said level sensor has not switched from said first state to said second state.

3. The substrate processing apparatus according to claim 2, wherein said calculation unit detects said history of opening and closing events of said valve through said processing controller, determines an amount of time said valve was open based on said history of opening and closing events of said valve, and multiplies said amount of open time of said valve by a processing liquid consumption rate to calculate said calculated amount of consumed processing liquid, said processing liquid consumption rate being an amount of processing liquid consumed from said processing liquid in said tank per unit time when said valve is open.

4. The substrate processing apparatus according to claim 2, wherein:

said tank is provided with an inert gas supply line for supplying an inert gas and an inert gas valve for opening and closing said inert gas supply line;

said processing controller opens and closes said inert gas valve and said valve simultaneously; and said calculation unit detects histories of opening and closing events of said inert gas valve and said valve through said processing controller, determines an amount of time both said inert gas valve and said valve were open based on said histories, and multiplies said amount of open time by a processing liquid consumption rate to calculate said calculated amount of consumed processing liquid, said processing liquid consumption rate being an amount of processing liquid consumed from said processing liquid in said tank per unit time when both said inert gas valve and said valve are open.

5. The substrate processing apparatus according to claim 2, wherein after said substrate has been processed in said substrate processing chamber, said anomaly detection controller checks whether said failure alarm has been issued, and if said failure alarm has been issued, said anomaly detection controller causes said processing controller to assume a maintenance state.

6. The substrate processing apparatus according to claim 2, wherein said alarm determination unit generates a low liquid alarm when said calculated amount of consumed processing liquid exceeds a maximum allowable liquid consumption amount which is greater than said state transition liquid consumption amount.

7. The substrate processing apparatus according to claim 3, further comprising a data storage unit storing data of said state transition liquid consumption amount and said processing liquid consumption rate, wherein said anomaly detection controller reads and uses said data stored in said data storage unit.

8. The substrate processing apparatus according to claim 1, further comprising a replenishment tank storing a processing liquid, a replenishment line connected between said replenishment tank and said tank, and a replenishment valve for opening and closing said replenishment line, wherein upon detecting that said level sensor has assumed said second state, said processing controller opens said replenishment valve and thereby replenishes said processing liquid in said tank until said level sensor has switched from said second state to said first state.

9. The substrate processing apparatus according to claim 8, wherein:

said anomaly detection controller has a calculation unit for calculating said calculated amount of consumed processing liquid by multiplying an amount of open time of said valve by a processing liquid consumption rate, said processing liquid consumption rate being an amount of processing liquid consumed from said processing liquid in said tank per unit time when said valve is open; and upon detecting completion of said replenishment of said processing liquid in said tank, said calculation unit clears a memory location storing said amount of open time of said valve.

10. The substrate processing apparatus according to claim 8, further comprising a high level sensor which assumes a third state when a level of said processing liquid in said tank is higher than an upper limit level and which assumes a fourth state when a level of said processing liquid in said tank is lower than said upper limit level, said upper limit level being higher than said reference level, wherein said processing controller detects whether said high level sensor is in said third state or said fourth state, and if said high level sensor is in said third state, said processing controller closes said replenishment valve.

* * * * *